United States Patent
Hannus et al.

(10) Patent No.: US 6,494,125 B2
(45) Date of Patent: Dec. 17, 2002

(54) PNEUMATIC BRAKE BOOSTER WITH VARIABLE FORCE TRANSMISSION RATIO

(75) Inventors: Thomas Hannus, Mayen (DE); Gerd Puscher, Andernach (DE)

(73) Assignee: Lucas Industries public limited company (GB)

(*) Notice: Subject to any disclaimer, the term of this patent is extended or adjusted under 35 U.S.C. 154(b) by 0 days.

(21) Appl. No.: 09/974,005

(22) Filed: Oct. 10, 2001

(65) Prior Publication Data

US 2002/0020285 A1 Feb. 21, 2002

Related U.S. Application Data

(63) Continuation of application No. PCT/EP00/02974, filed on Apr. 4, 2000.

(30) Foreign Application Priority Data

Apr. 13, 1999 (DE) .......................... 199 16 579

(51) Int. Cl.$^7$ .............................................. F15B 9/10
(52) U.S. Cl. ........................................... 91/369.2
(58) Field of Search ...................................... 91/369.2

(56) References Cited

U.S. PATENT DOCUMENTS

| | | | |
|---|---|---|---|
| 5,367,942 A | | 11/1994 | Nell et al. |
| 5,699,713 A | | 12/1997 | Mortimer ............... 91/369.2 |
| 5,819,633 A | * | 10/1998 | Satoh .................... 91/369.2 |
| 5,884,548 A | * | 3/1999 | Ando et al. ............. 91/369.2 |
| 5,893,316 A | * | 4/1999 | Inoue et al. ............. 91/369.2 |
| 6,135,007 A | * | 10/2000 | Tsubouchi ................ 91/367 |
| 6,192,783 B1 | * | 2/2001 | Tobisawa ............... 91/369.2 |
| 6,205,905 B1 | * | 3/2001 | Satoh et al. ............ 91/369.2 |
| 6,209,441 B1 | * | 4/2001 | Takaku et al. .......... 91/369.2 |
| 6,269,731 B1 | * | 8/2001 | Gautier et al. .......... 91/369.2 |
| 6,397,723 B1 | * | 6/2002 | Suwa ..................... 91/369.2 |

FOREIGN PATENT DOCUMENTS

| | | |
|---|---|---|
| DE | 4234041 | 3/1994 |
| DE | 19750514 | 5/1999 |
| EP | 901950 | 5/1999 |
| JP | 10230840 | 9/1998 |
| WO | 95/91272 | 1/1995 |

* cited by examiner

Primary Examiner—John E. Ryznic
(74) Attorney, Agent, or Firm—MacMillan, Sobanski & Todd, LLC

(57) ABSTRACT

A pneumatic brake booster (10) comprises a control valve (22) for controlling a pneumatic pressure difference, a force input element (24) for actuating the control valve (22), a force output element (38) for transmitting the braking force, a reaction disk (34) made of elastomeric material disposed between the force output element (38) and the force input element (24), and a device, which is disposed between the reaction disk (34) and the force input element (24) and acts upon the reaction disk (34), for varying the force transmission ratio between force input element (24) and force output element (38) in dependence upon the force exerted on the force input element (24). For a less expensive design and greater ease of assembly, the device for varying the force transmission ratio is designed as a preassembly unit in the form of a cartridge (30), which after preassembly is insertable into the control valve (22). The cartridge (30) comprises a plunger (42), of which the end facing the reaction disk (34) is connected to a piston (50), a hollow-cylindrical operating piston (52), which surrounds the piston (50) and is displaceable relative to the latter, a stop (60), which is provided on the plunger (42) and defines an initial position, in which the areas of operating piston (52) and piston (50) facing the reaction disk (34) form a common, flush area, and a spring (48), which is supported against the plunger (42) and which biases the operating piston (52) towards the stop (60).

7 Claims, 3 Drawing Sheets

PNEUMATIC BRAKE BOOSTER WITH VARIABLE FORCE TRANSMISSION RATIO

CROSS REFERENCE TO RELATED APPLICATIONS

This application is a continuation of International Application No. PCT/EP00/02974 filed Apr. 4, 2000, which claims priority to German Patent Application No. 19916579,3 filed Apr. 13, 1999.

BACKGROUND OF THE INVENTION

The invention relates to a pneumatic brake booster. Such a brake booster designed as a vacuum brake booster for a motor vehicle is known from WO 95/01272, which is incorporated by reference herein.

Pneumatic brake boosters normally have a fixed force transmission ratio, i.e. an actuating force introduced by means of an input element into the brake booster is transmitted from a smaller area associated with the input element to a larger area associated with the power output element, mostly via a so-called reaction disk which is made of elastomeric material and behaves like a fluid. Under certain circumstances, e.g. in an emergency braking situation, it is however desirable to provide a user with as high a braking force boost as possible so that, starting from a specific input force, as high a brake pressure as possible may be generated.

In the said WO 95/01272 it is therefore proposed that the smaller area, which acts upon the reaction disk and is associated with the input element, be further reduced in size after a specific input force is exceeded. Said reduced area, compared to the non-reduced area, given the same input or actuating force penetrates further into the elastic reaction disk, with the result that the control valve of the brake booster opens correspondingly wider, resulting in a correspondingly higher differential pressure in the brake booster and hence in an increased force boost. The solutions proposed in WO 95/01272 are however of a relatively complex construction and moreover make assembly of the brake booster considerably more complicated.

SUMMARY OF THE INVENTION

The object of the invention is therefore to provide a pneumatic brake booster with a device for varying the force transmission ratio in dependence upon the force exerted upon the force input element, which device is to be of as simple a construction as possible and, above all, easy to assemble.

Proceeding from a brake booster of the type described, said object is achieved according to the invention in that the device for varying the force transmission ratio is designed as a preassembly unit in the form of a cartridge, which after preassembly is insertable into the control valve. The cartridge comprises a plunger, of which the end facing the reaction disk is connected to a piston, a hollow-cylindrical operating piston, which surrounds the previously mentioned piston and is displaceable relative to the piston, a stop, which is provided on the plunger and defines for the operating piston an initial position, in which the areas of operating piston and piston facing the reaction disk form a common, flush area, and a spring, which is supported against the plunger and which biases the operating piston towards the stop. In said manner a compact, easy-to-preassemble unit is provided, which after preassembly need merely be inserted into a corresponding recess of the control valve. There is no need for more extreme modifications of the structural design of the brake booster or control valve, rather the cartridge used according to the invention may be integrated without a high outlay into many existing brake booster constructions. The possibility therefore exists of being able to offer one and the same brake booster construction with or without variable force transmission.

The operating piston is preferably guided in a slidingly displaceable manner on a stem of the plunger. Such a construction removes the need for a separate guide for the operating piston and results in a compact style of construction.

In order further to simplify the structural design and reduce the size of the device for varying the transmission ratio, in preferred forms of construction of the brake booster according to the invention the plunger stem at its end facing the force input element is connected to a plate, against which the spring, which biases the operating piston towards the stop, is supported. In said case, the outside diameter of the operating piston is advantageously greater than the outside diameter of the plate so that the operating piston, in the event of greater input forces, may be supported against a step, which is situated in the recess provided in the control valve housing for receiving the cartridge. The plate may be formed integrally with the plunger stem.

The stop defining the initial position of the operating piston is preferably formed by a retaining ring (snap ring), which is held in a groove of the plunger stem. Such a construction is inexpensive and easy to assemble.

The spring biasing the operating piston into its initial position may have a linear spring characteristic curve. Equally, however, said spring may have a progressively rising spring characteristic curve, with the result that the braking force boost of the brake booster according to the invention increases progressively, beginning with the movement of the operating piston out of its initial position up to the attainment of an end position of the operating piston. The end position of the operating piston may be defined e.g. by the already mentioned shoulder in the recess of the control valve housing used to receive the cartridge.

The piston, which is connected to the end of the plunger facing the reaction disk, preferably has an at least approximately spherical-segment-shaped protuberance on its area facing the reaction disk. By means of such a protuberance a specific, so-called "entry behaviour" of the brake booster is realized. To put it more precisely, at the start of an actuation of the brake booster the spherical-segment-shaped protuberance, given a defined force, penetrates more deeply into the reaction disk, with the result that the control valve in the initial phase of a braking operation may open slightly wider and the brake booster therefore relatively quickly provides a specific braking force boost.

DETAILED DESCRIPTION OF THE INVENTION

Figure 1:
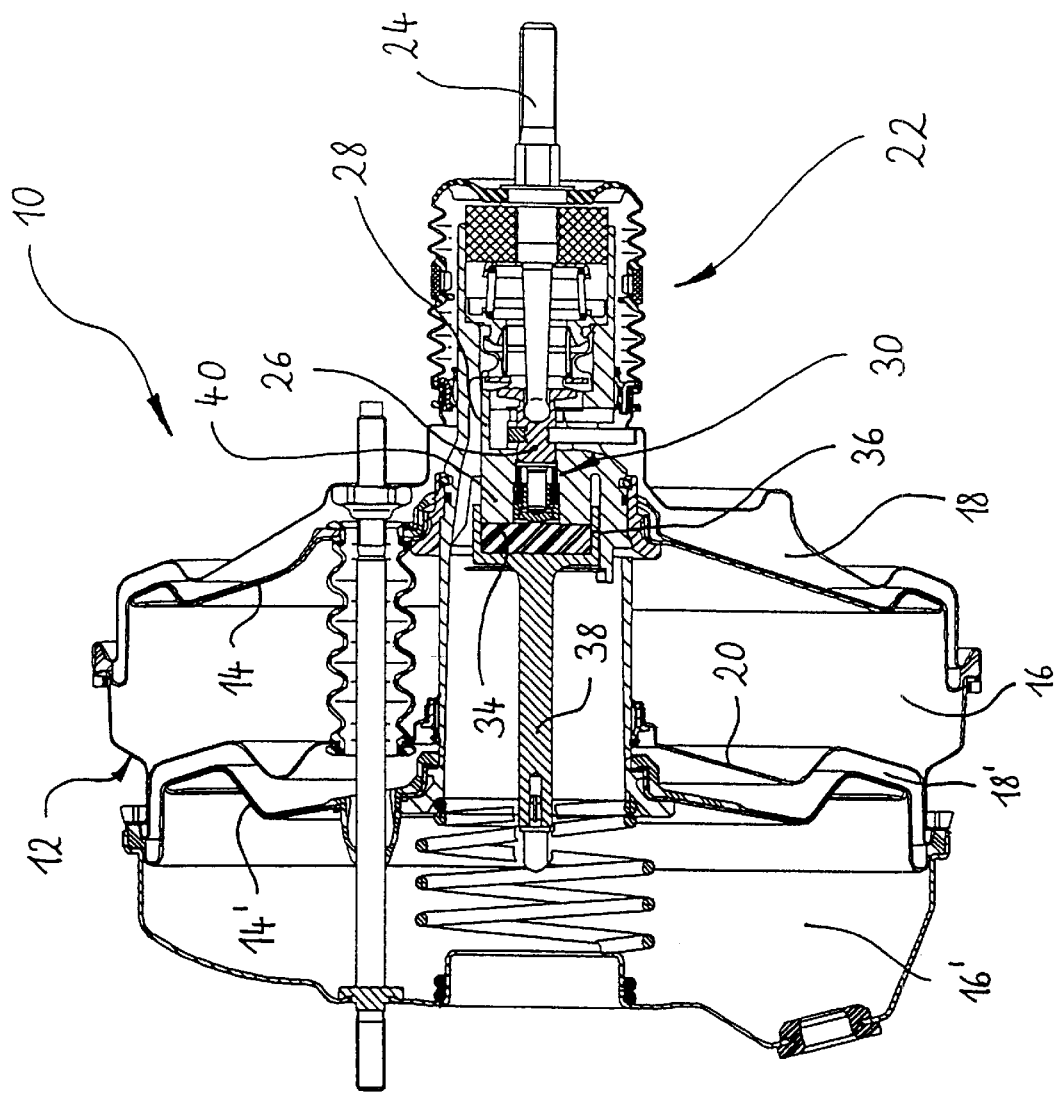
FIG. 1 a longitudinal section through a brake booster according to the invention with a device for varying the force transmission ratio between force input element and force output element, FIG. 2 a detail from FIG. 1 illustrating the device for varying the force transmission ratio to an enlarged scale, wherein the device is shown in a state such as arises in the non-actuated state of the brake booster, FIG. 3 the detail according to FIG. 2 with the device in a position such as arises during normal actuation of the brake booster, FIG. 4 the detail according to FIG. 2 with the device in a position, in which because of an increased actuating force a specific relative displacement of two pistons of the device has already occurred, FIG. 5 the detail according to FIG. 2 with the device in a position, in which an outer piston of the device lies against a housing-fixed stop, FIG. 6 the detail according to FIG. 2 with the device in a position, which it adopts when the actuating force is increased further relative to FIG. 5, and FIG. 7 a graph showing the variation of the transmission ratio of the brake booster according to the invention as a function of the input force.

FIG. 1 shows in longitudinal section a typical vacuum brake booster 10 having a housing 12, which is subdivided by a movable wall 14 into a vacuum chamber 16 and a working chamber 18. The brake booster 10 illustrated here is of a tandem style of construction, i.e. it comprises an additional movable wall 14', which subdivides a part of the housing 12 partitioned off by a stationary wall 20 into a further vacuum chamber 16' and a further working chamber 18'.

Whereas the vacuum chambers 16 and 16' during operation of the brake booster 10 are in constant communication with a vacuum source, the working chambers 18, 18' may be brought selectively into communication either with a vacuum or with atmospheric pressure. For said purpose a control valve 22 is used, which in dependence upon the actuation of a force input element 24, which is usually connected to a brake pedal (not shown here), controls valve seats provided in the control valve 22 in such a way that atmospheric pressure may flow into the working chambers 18, 18' or—at the end of an actuation of the brake booster 10—the vacuum chambers 16, 16' are brought into communication with the working chambers 18, 18' in order to evacuate the latter. As the construction and operation of such a brake booster 10 are well known to experts in the present field, only parts, which are of relevance to the present invention, and the function of said parts are described in detail below.

The already mentioned force input element 24 is connected to a valve piston 26, which is accommodated in an axially displaceable manner in a housing 28 of the control valve 22. Adjoining the axially opposite side of the valve piston 26 to the force input element 24 is a device for varying the force transmission ratio, which is described in greater detail below and is inserted as a preassembled cartridge 30—in relation to the drawings—from the left into a stepped recess 32 of the control valve housing 28. Axially adjoining said cartridge 30 is a reaction disk 34, which is made of elastomeric material and accommodated in an end portion 36, which is widened in a cup-shaped manner, of a force output element 38 of the brake booster 10. The force output element 38 is guided by means of its cup-shaped end portion 36 on a hub-shaped end portion 40 of the control valve housing 28.

Upon an actuation of the brake booster 10 an actuating force exerted upon the force input element 24 causes displacement of the latter to the left, i.e. into the brake booster 10. Said displacement is transmitted to the valve piston 26, which is coupled to the force input element 24, and leads to opening of the valve seat which allows atmospheric pressure to flow into the working chambers 18, 18'. The valve piston 26 transmits the said displacement by means of the cartridge 30 to the reaction disk 34, the behaviour of which in an idealized manner may be compared to the behaviour of a hydraulic fluid. This means that the force exerted upon the force input element 24 is transmitted from the smaller cross-sectional area of the cartridge 30 by means of the reaction disk 34 to the larger cross-sectional area, which is defined by the inside diameter of the cup-shaped end portion 36, of the force output element 38. The ratio of the smaller cross-sectional area of the cartridge 30 to the larger cross-sectional area of the reaction disk 34 is the force transmission ratio of the brake booster 10.

The cartridge 30 is a device for varying said force transmission ratio and is now described in detail with reference to FIGS. 2 to 6. It comprises a plunger 42 with a stem 44, of which the end facing the force input element is connected in the illustrated embodiment integrally to a plate 46. The plate 46 is used, on the one hand, to transmit force from the valve piston 26 to the cartridge 30 and, on the other hand, to support a compression spring 48, which is disposed coaxially with and surrounds the plunger stem 44.

Fastened to the other end of the plunger stem 44 is a, here plate-shaped, circular piston 50 of a diameter $D_1$, which forms a part of the cross-sectional area of the cartridge 30 acting upon the reaction disk 34. Disposed coaxially with said piston 50 is a hollow-cylindrical operating piston 52, which is guided by means of a collar 54 in a slidingly displaceable manner on the plunger stem 44 and the inside diameter of which in the region of the piston 50, apart from the usual tolerances, corresponds to the outside diameter $D_1$ of the piston 50. The outside diameter $D_2$ of the operating piston 52 is greater than the outside diameter of the plate 46 and corresponds substantially to the greatest diameter of the stepped recess 32 in the control valve housing 28.

Held in a groove 56 on an end portion of the plunger stem 44 adjacent to the piston 50 is a retaining ring 58, which, after the operating piston 52 has been slipped onto the plunger stem 44, is fastened in the groove 56 and then forms a stop 60 for the operating piston 52. The compression spring 48 supported against the plate 46 biases the collar 54 of the operating piston 52 towards said stop 60.

Figure 2:
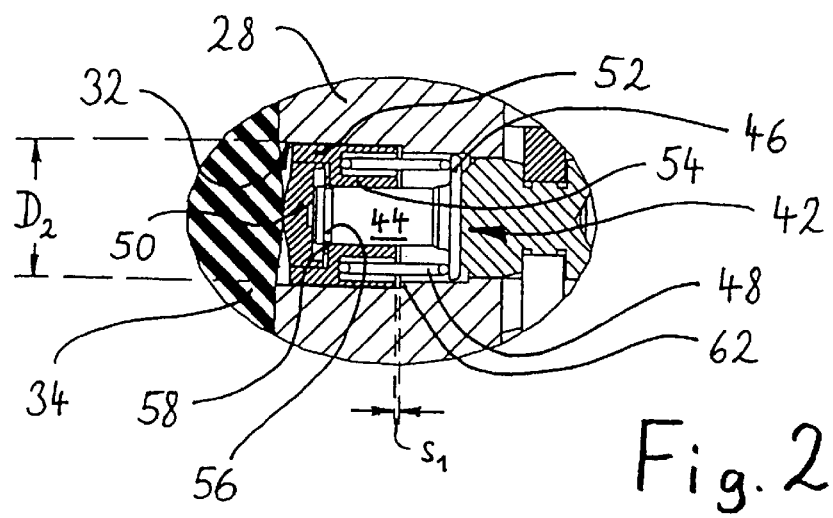

In the initial position defined by the stop 60, the areas of piston 50 and operating piston 52 facing the reaction disk 34 form a single, flush area in the manner evident from FIG. 2. In said initial position there is an axial clearance si between the end of the operating piston 52 remote from the reaction disk 34 and an annular shoulder 62 formed by a reduction in diameter of the recess 32.

The operation of the cartridge 30 in dependence upon the force exerted on it by means of the valve piston 26 is as follows:

When the non-illustrated brake pedal coupled to the force input element 24 is pressed down, said movement is transmitted from the force input element 24 to the valve piston 26 and from the latter to the plate 46 of the cartridge 30. Starting from the position shown in FIG. 2 the entire cartridge 30 is displaced to the left, wherein first of all a spherical-segment-shaped protuberance 64 provided on the piston 50 penetrates into the reaction disk 34. Because of the initially very low contact area between the protuberance 64 and the reaction disk 34 the piston 50 may penetrate relatively quickly into the reaction disk 34, which leads in the initial phase of an actuation to a rapid opening of the control valve 22 and hence to the rapid build-up of a braking force boost. This is recognizable in the graph of FIG. 7, which shows the brake pressure in a master cylinder, which is acted upon by the force output element 38 and not shown here, plotted against the input force introduced by means of the force input element 24, from the fact that the master cylinder pressure—after overcoming an initial play (point A)—rises steeply (section between points A and B).

Figure 3:
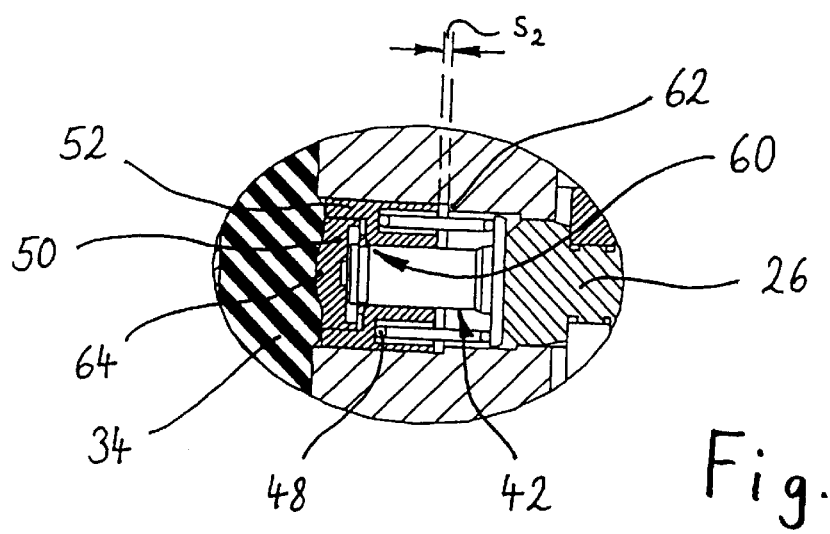
Figure 4:
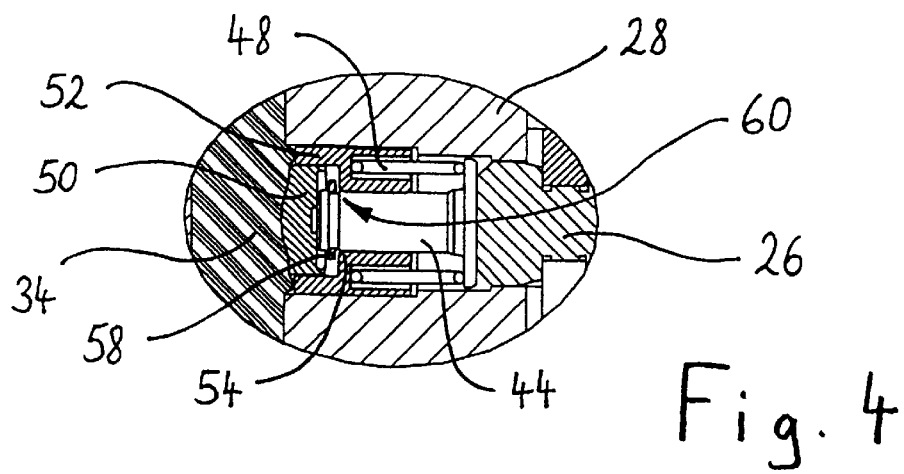

A further displacement of the force input element 24 leads, however, after a short time to an application of the full area of both the piston 50 and the operating piston 52 against the reaction disk 34 (see FIG. 3). The cartridge 30 has in said case been displaced as a whole to the left, which is apparent from the now greater clearance S2 between the annular shoulder 62 and the inner end of the operating piston 52. The brake pressure, which has meanwhile built up in the non-illustrated master cylinder and is retroacting via the force output element 38, leads to the material of the reaction disk 34 being pressed slightly into the recess 32. The retroactive force transmitted via the reaction disk 34 to the operating piston 52 is however still not sufficient to compress the compression spring 48.

In said state (see, in FIG. 7, the section between points B and C) the force transmission ratio of the brake booster 10 is therefore defined by the ratio of the diameter $D_2$ to the inside diameter of the cup-shaped end portion 36, which accommodates the reaction disk 34.

Figure 7:
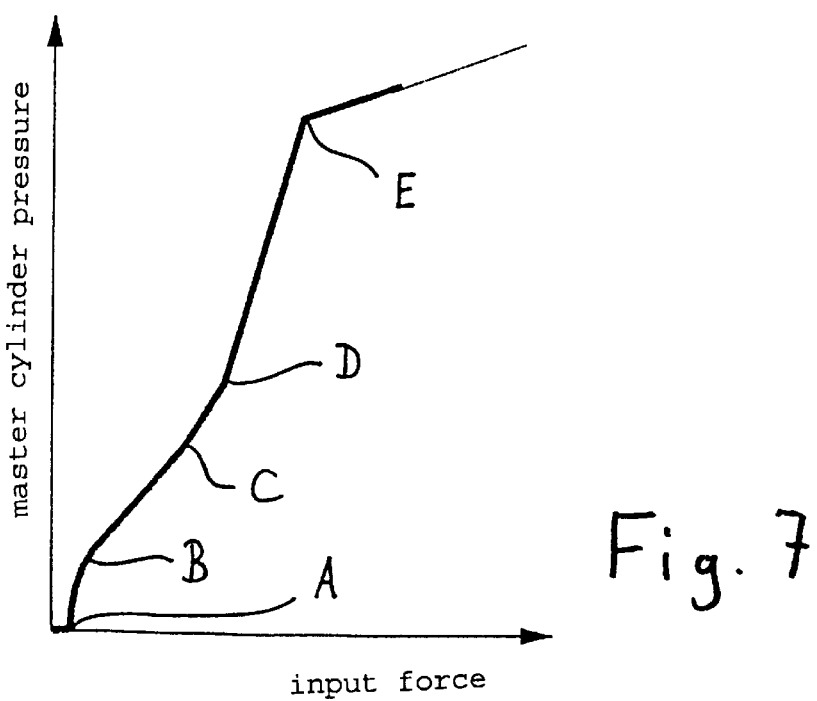

Upon a further increase of the input force summoned up by means of the force input element 24, the piston 50, which is connected by the plunger 42 rigidly to the valve piston 26, of the cartridge 30 is displaced further to the left and hence pressed more deeply into the reaction disk 34. The correspondingly higher brake pressure achieved in the master cylinder retroacts via the reaction disk 34 also upon the operating piston 52 and is then sufficient to compress the compression spring 48. The operating piston 52 consequently detaches itself from the stop 60 formed by the retaining ring 58 and the clearance between the inner end of the operating piston 52 and the annular shoulder 62 is reduced (see FIG. 4). In the graph of FIG. 7 this is recognizable from the fact that the section, which is situated between points C and D of the curve and follows the previously mentioned flatter section between points B and C, becomes increasingly steeper.

Finally, upon a further increase of the input force the inner end of the operating piston 52 comes into contact with the annular shoulder 62 (see FIG. 5), which leads to "grounding" of the operating piston 52, i.e. the area of the operating piston 52 in contact with the reaction disk 34 now has no further influence upon the force transmission ratio of the brake booster 10. Now, only the smaller area of the piston 50 is effective, with the result that the force transmission ratio of the brake booster 10 now arises from the ratio of the diameter $D_1$ of the piston 50 to the inside diameter of the cup-shaped end portion 36. In FIG. 7 the position of the cartridge 30 shown in FIG. 5 corresponds to the point D.

Figure 5:
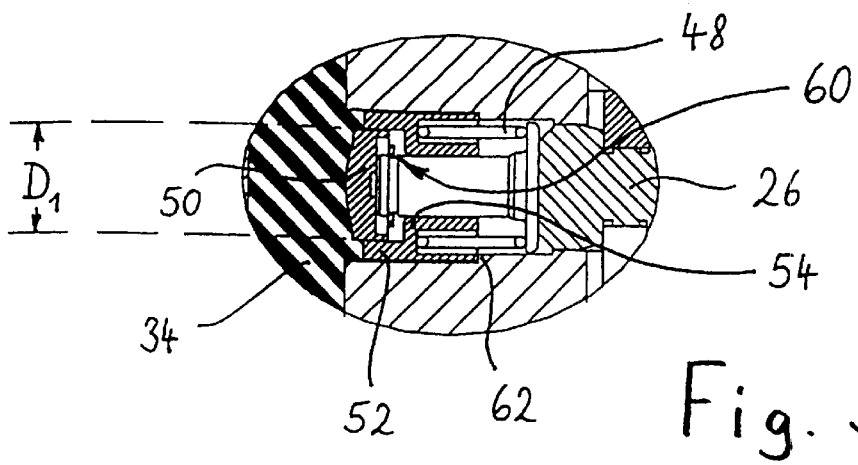
Figure 6:
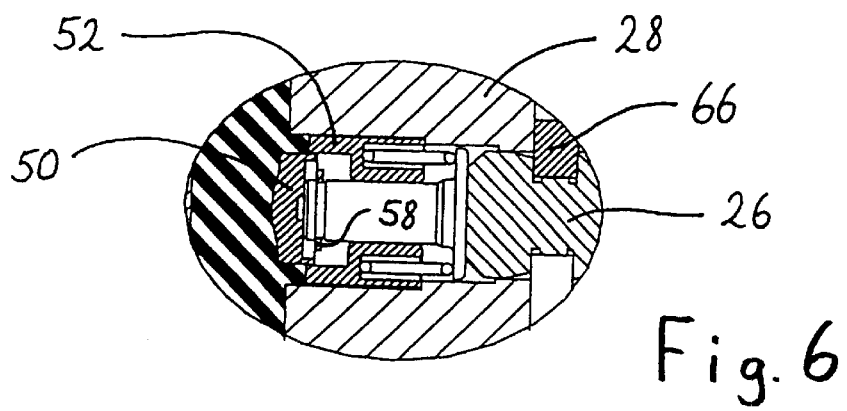

Proceeding from FIG. 5, upon a further increase of the input force the piston 50 penetrates even more deeply into the reaction disk 34 (see FIG. 6) until a locking bar 66, which is connected to the valve piston 26 and extends in a radial recess of the control valve housing 28, strikes against the control valve housing 28 (see FIG. 6). This is the so-called saturation point of the brake booster 10, which in FIG. 7 corresponds to the point E. A further increase of the input force may therefore no longer be boosted by the brake booster 10 and therefore leads to a correspondingly lower rise of the master cylinder pressure.

When the brake is released, the described positions of the cartridge 30 are run through in reverse direction.

From the above functional description it is clear that the slope and the shape of the curve shown in FIG. 7 between the points C and D depends upon the characteristic of the compression spring 48. The slope of the said section of the curve may be influenced by differing spring stiffnesses, wherein such differing spring stiffnesses may even be provided in one and the same compression spring 48 (progressive spring characteristic curve) in order to influence the characteristic of the force transmission ratio in the said curve section in a desired manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Pneumatic brake booster, in particular for motor vehicles, comprising a control valve for controlling a pneumatic pressure difference, a force input element for actuating the control valve, a force output element for transmitting the braking force, a reaction disk made of elastomeric material disposed between the force output element and the force input element, and a device, which is disposed between the reaction disk and the force input element and acts upon the reaction disk, for varying the force transmission ratio between force input element and force output element in dependence upon the force exerted on the force input element, characterized in that the device for varying the force transmission ratio is designed as a preassembly unit in the form of a cartridge, which after preassembly is insertable into the control valve, wherein the cartridge comprises:

a plunger, of which the end facing the reaction disk is connected to a piston, a hollow-cylindrical operating piston, which surrounds the piston and is displaceable relative to the piston, a stop, which is provided on the plunger and defines an initial position, in which the areas of operating piston and piston facing the reaction disk form a common, flush area, and a spring, which is supported against the plunger and which biases the operating piston towards the stop.

2. Brake booster according to claim 1, wherein the operating piston is guided in a slidingly displaceable manner on a stem of the plunger.

3. Brake booster according to claim 2, wherein the plunger stem at its end facing the force input element is connected to a plate, against which the spring is supported.

4. Brake booster according to claim 3, wherein the outside diameter of the operating piston is greater than the outside diameter of the plate.

5. Brake booster according to claim 2, wherein the stop is formed by a retaining ring, which is held in a groove of the plunger stem.

6. Brake booster according to claim 1, wherein the spring has a progressively rising spring characteristic curve.

7. Brake booster according to claim 1, wherein the area of the piston facing the reaction disk has an at least approximately spherical-segment-shaped protuberance.

* * * * *